United States Patent [19]

Greenfield, Jr. et al.

[11] 4,080,524
[45] Mar. 21, 1978

[54] ADJUSTABLE CONTROLLER FOR MICROWAVE FOOD PREPARATION

[75] Inventors: Irving E. Greenfield, Jr.; Paul H. Martin; Ronald C. Jacobson, all of Miami, Fla.

[73] Assignee: Food Systems, Inc., Miami, Fla.

[21] Appl. No.: 675,202

[22] Filed: Apr. 8, 1976

[51] Int. Cl.² .............................................. H05B 9/06
[52] U.S. Cl. .............................. 219/10.55 E; 99/416; 219/10.55 F; 426/243
[58] Field of Search ................... 219/10.55 E, 10.55 F; 426/107, 237, 241, 243, 234; 99/416, 448

[56] References Cited

U.S. PATENT DOCUMENTS

| | | | |
|---|---|---|---|
| 3,854,022 | 12/1974 | Moore | 219/10.55 E |
| 3,935,415 | 1/1976 | Moore | 219/10.55 F |
| 3,985,992 | 10/1976 | Goltsos | 219/10.55 E |
| 3,987,267 | 10/1976 | Moore | 219/10.55 E |
| 4,013,798 | 3/1977 | Goltsos | 219/10.55 E |

*Primary Examiner*—Arthur T. Grimley
*Attorney, Agent, or Firm*—Clarence A. O'Brien; Harvey B. Jacobson

[57] ABSTRACT

A controller in the form of an insert for a microwave oven having apertures or openings therein, each of which is provided with an adjustable closure for controlling the amount of radiation reaching food being heated or cooked in the oven. The controller unit includes a radiation-opaque shield or panel supported in elevated relation to the bottom of the microwave oven with the apertures being provided in the panel at desired positions with the apertures being of different sizes and having closure members to enable the size of the apertures to be varied for more effectively controlling the amount of radiation engaging food products placed under the controller. A positioning attachment is provided for the controller unit to enable it to be placed accurately in the oven and to adjust the controller to a proper position for various commercially available microwave ovens. An interior size adjustment element positioned within the controller permits use of standard service plates of any size and combinations of serving dishes, saucers, and the like. Two or more of the controller units may be connected together for use in a large oven. The open front of the controller is closed by two alternative methods to retain steam and prevent food soiling in the oven.

20 Claims, 6 Drawing Figures

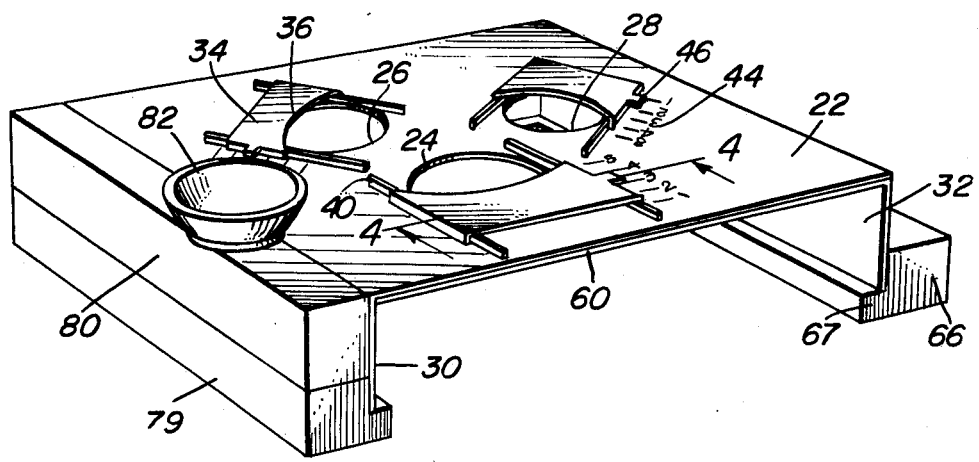
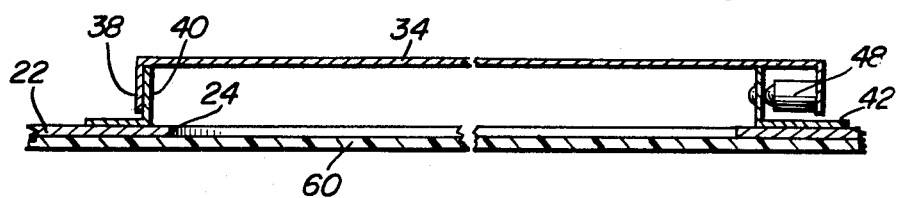
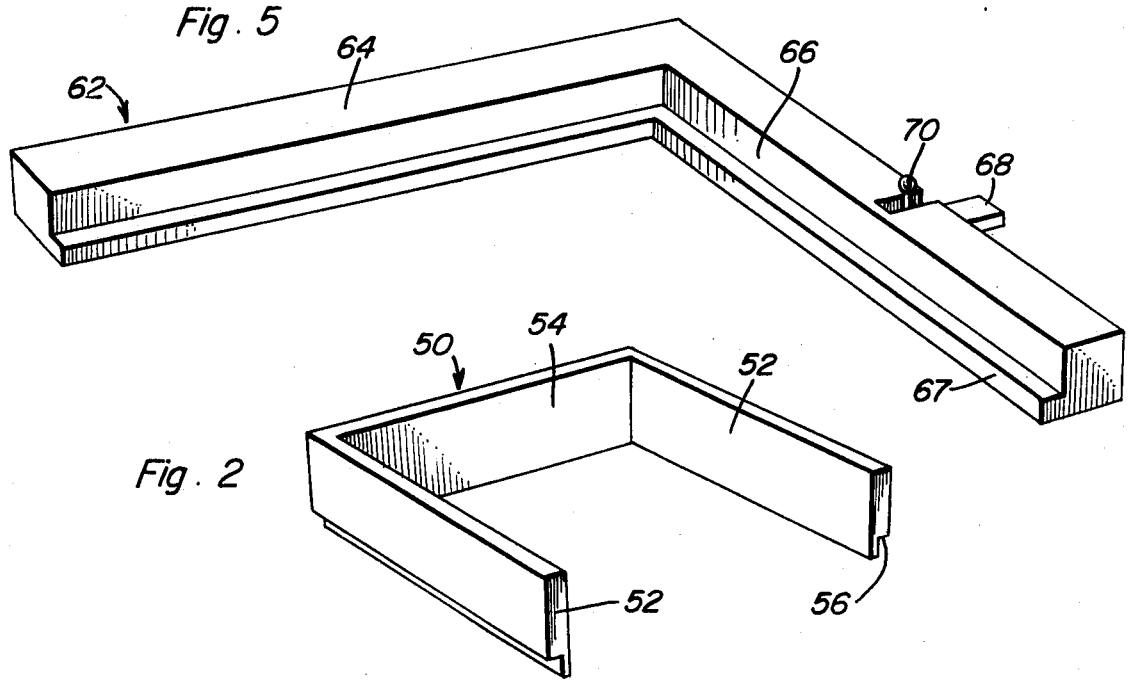

ADJUSTABLE CONTROLLER FOR MICROWAVE FOOD PREPARATION

BACKGROUND OF THE INVENTION

1. Field of the Invention

The present invention generally relates to a unit used in combination with a conventional microwave oven, without modification of the oven, in the form of an adjustable controller to control the amount of radiation reaching the food being heated or cooked.

2. Description of the Prior Art

Microwave ovens have come into widespread use in the preparation of various foods. Microwave ovens utilize microwave energy generated by a magnetron which is emitted in a manner to strike a slowly revolving fan or "mode mixer" which reflects the microwave energy and causes it to bounce off all of the surfaces of the oven so that it enters the food from all sides to cook it evenly throughout. While microwave ovens have been utilized extensively in homes, they have also been promoted heavily for commercial or institutional feeding and they have come into widespread use in hospitals, restaurants, and the like. Even though microwave ovens have received substantial acceptance, there is still a substantial lack of knowledge regarding the characteristics of the microwave radiation inside an oven. It is known that reflected radiation is uneven, constantly varies and is quite unpredictable. Another factor involved is the different and sometimes unexpected behavior of various foods when exposed to radiation. In some instances, food will heat erratically and with unusual time parameters or sometimes not at all. Some foods will burn but not brown while others become extremely hot at the center and remain cool at the edges, while in others just the reverse occurs. Increases in mass are not necessarily or always proportional to extended cooking times and some foods tend to disintegrate or literally explode when certain conditions occur.

Prior Pat. No. 3,271,169, issued Sept. 6, 1966, to Baker, et al., discloses some of the problems which are inherent in preparing food in a microwave oven and apparently discloses one of the first efforts to solve some of the problems relating to microwave oven cooking. U.S. Pat. No. 3,302,632, issued Feb. 7, 1967, to Richtner, discloses a utensil for use in microwave heating of different foods and generally is in the form of a prepackaged meal. U.S. Pat. No. 3,547,661, issued Dec. 15, 1970, to Stevenson, discloses a container for use in a microwave oven which is constructed in a manner to heat different foods in the container to different temperature levels which requires the provision of a variety of container sizes and types which introduces inherent problems of matching the container availability with utility requirements. U.S. Pat. No. 3,615,713, issued Oct. 26, 1971, to Stevenson, discloses another special container for heating or cooking different foods to a different degree and would also require a large supply of various containers to match the requirements of every type of food and various serving sizes, and the like.

While attempts have been made to heat or cook various foods placed in a microwave oven to different desired temperature levels or conditions, such attempts generally have related to the provision of special containers for the diverse foods, which requires a supply of such containers, thus necessarily increasing the cost and time involved since the food, after it has been cooked or heated in the special containers then must be placed in a serving dish before it is delivered to the ultimate consumer.

SUMMARY OF THE INVENTION

An object of the present invention is to provide a controller in the form of an insert unit which can be placed in any conventional microwave oven without modification and which includes features which enable various foods placed in their conventional serving dishes to be rapidly heated or cooked to a finished condition even though the various foods require different heating or cooking conditions.

Another object of the invention is to provide a controller in the form of a plate or panel serving as a shield for the foods placed in the oven with the plate having apertures therethrough provided with adjustable closure means for adjusting the passage of microwave energy to the food products thereby enabling the heating or cooking conditions of each food product placed in the oven to be accurately controlled which enables the controller to be matched to the exact combination of menu, portion size and number of foods being served at any particular time, thereby enabling the microwave oven to be more effectively used for institutional feeding for rapidly heating or finishing large numbers of meals, such as meals to be fed to patients in a hospital.

A further object of the present invention is to provide a controller in accordance with the preceding object which includes a positioning attachment which will accurately position the controller unit in the microwave oven. Since each microwave oven has its own peculiar pattern of hot and cold spots, the positioning attachment not only enables the controller unit to be placed in the same position in the oven but also locates it in an off-center position to permit simultaneous heating of liquids such as soups which accompany meals.

Still another object of the invention is to provide a controller unit for microwave ovens in accordance with the preceding objects in which an interior size adjustment element is provided to permit use of standard size service plates, dishes, and the like, with the device also including a plastic shield or coating on the undersurface of the radiation-opaque shield to maintain sanitary conditions and reduce the necessity of providing plastic coverings for food in order to maintain proper moisture conditions.

A still further object of the invention is to provide a controller together with means closing the forward, normally open, end thereof to retain steam within the controller and prevent food soiling in the oven with two embodiments of the closing means being disclosed.

Yet another important object of the present invention is to provide a controller unit which is quite simple in construction, easily installed and adjusted by operating personnel with use of the controller unit increasing the maximum number of varieties of foods possible to prepare in a microwave oven, providing maximum menu flexibility, and enabling preparation of all foods normally served in commercial, institutional or health care facilities. The controller is easily altered by a user to meet particular requirements or temporary needs, capable of being left in the microwave oven for use in preparing various meals and use of the controller enables simultaneous preparation of fast-to-heat and slow-to-heat foods for providing proper consumption temperatures for each food of a group of different foods, which may be served together as in a meal, accurately controls temperature variation within a serving of food, eliminates need for plastic covering over meals which are provided to prevent food from drying out, reduces preparation time by concentrating, controlling, directing and retaining microwave energy, protects the oven by preventing food soiling and also results in reduction in labor costs, upkeep costs, operating costs, as well as food costs.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a perspective view of the interior size adjustment element.

FIG. 3 is a perspective view of the controller with a position attachment for use in narrow ovens associated therewith.

FIG. 4 is a detailed sectional view illustrating the structure of the closure element and the manner of adjusting the position thereof, taken generally along section line 4—4 on FIG. 3.

FIG. 5 is a perspective view of the positioning attachment employed in FIG. 1.

DESCRIPTION OF THE PREFERRED EMBODIMENT

Figure 1:
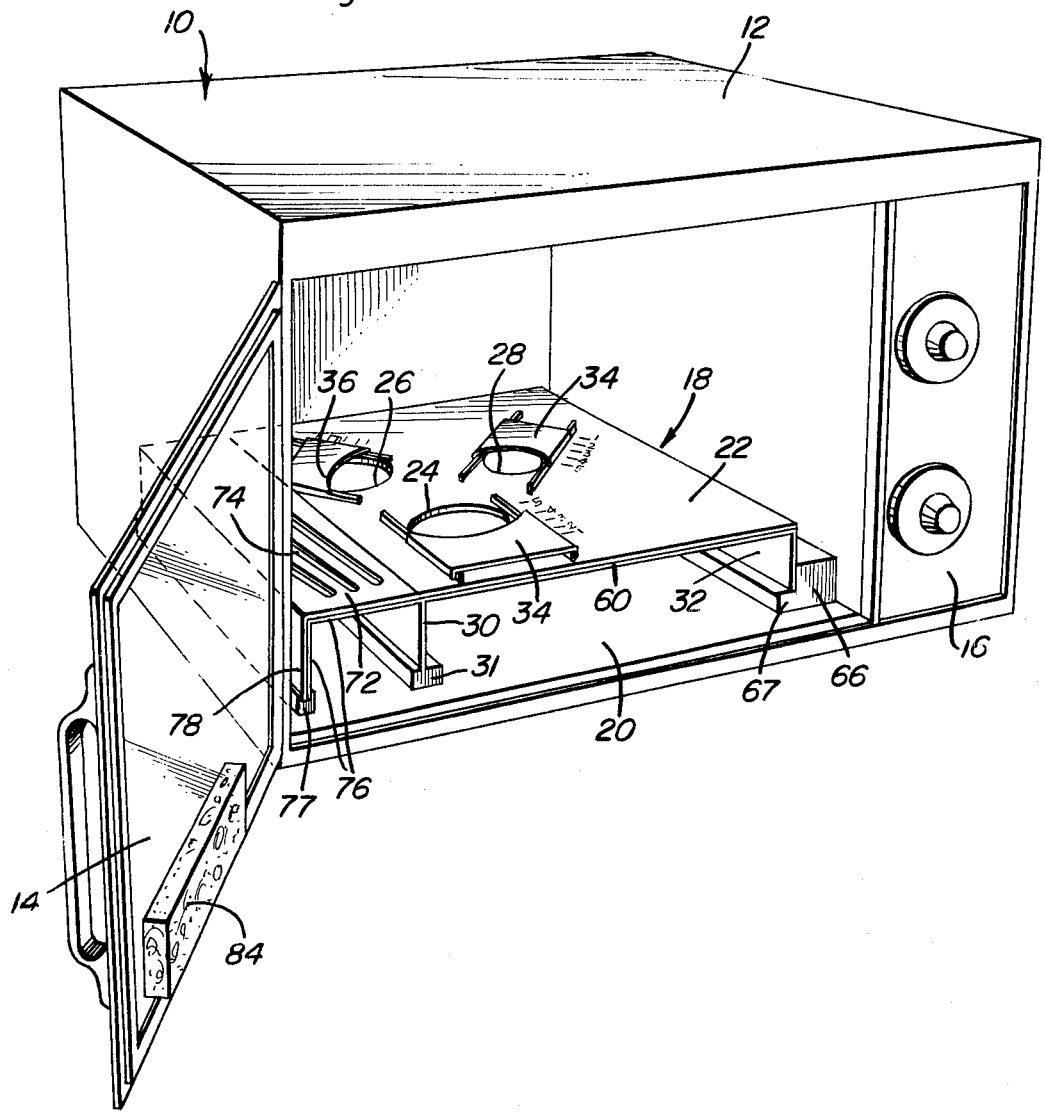
FIG. 1 is a perspective view of a typical microwave oven with the adjustable controller and closure means therefor of the present invention incorporated therein.

Referring now specifically to the drawings, in FIG. 1, the reference numeral 10 generally designates a microwave oven of conventional construction which includes a cabinet 12 having an open front closed by a pivotal door 14 with suitable controls mounted on a control panel 16 alongside of the opening in the cabinet 12. The structure of the cabinet 12, the microwave energy emitter or magnetron as well as the deflector or mixer are not disclosed with it being understood that the specific structural details of a microwave oven do not form any specific part of the present invention inasmuch as it may be employed with various types and sizes of commercially available microwave ovens.

The controller 18 of the present invention is inserted into the cabinet 12 and rests on the bottom surface 20 of the microwave oven and extends from the front of the opening in the cabinet toward the rear thereof. The controller 18 is in the form of an insert which includes a rigid, generally rectangular or square panel 22 having three apertures or openings therethrough designated by numerals 24, 26 and 28. The plate or panel 22 is spaced above the bottom of the oven by side panels 30 and 32 and a rear panel of equal depth so that plates and other conventional serving dishes may be positioned under the controller 18. The aperture 24 is of a large size while the aperture 26 is medimum size and the aperture 28 smaller so that entrees may be positioned under the aperture 24, high mass vegetables may be positioned under the medium size aperture 26 and low mass items may be positioned under the small aperture 28. Each of the apertures 24, 26 and 28 are provided with a sliding closure member 34 in the form of a panel having an arcuate inner edge 36 and downturned parallel side edges 38 which are slidably positioned on upturned flanges 40 of a pair of guide rails 42 secured in any suitable manner to the panel 22, as illustrated in FIG. 4. The closure members 34 may be moved longitudinally on the guide rails 42 in order to adjust the size of the respective openings. A graduated scale and numerical indicia 44 is provided alongside of one of the rails with a tab 46 projecting from the closure member for association within the scales and indicia so that a particular location of the closure member may be determined to enable the same position to be set in a repetitive manner when desired. A spring loaded detent 48 may be provided on one of the downturned flanges 38 which is spaced from the upstanding flange 40 with the spring loaded detent 48 cooperating with corresponding spaced recesses for frictionally and resiliently retaining the closure elements in adjusted position so that they will not accidentally become maladjusted. This type is construction enables the arcuate inner edges of the closure members to cooperate with the circular configuration of the openings to maintain generally a circular shape for the aperture opening and to keep it centered on the food below irrespective of the size of the opening. It is pointed out that various types of structural mechanisms may be provided for enabling adjustable movement of the closure members together with means releasably securing the closure members in adjusted position with indicia being provided to enable the closure members to be preset in a desired position and to enable optimum preset positions of the closure members to be selected by an operator.

The aperture closure members 34 may be adjusted without removing the controller unit from the oven thus adding to the speed and ease of operation which is vital to acceptance in institutional feeding. Also, each of the closure members 34 closes toward the center of the plate or panel 22 and since small portion sizes of food begin at the center and extend to the serving plate edge, as they become larger, the aperture center can always be centered with respect to the food regardless of the portion size, thereby enabling proper and predictable preparation. One example of the flexibility of the controller is a situation where an entree needs to be cooked or heated even though the rest of the contents of the plate are not to be increased in temperature. Thus, by closing the two smaller apertures and adjusting the third, this can be accomplished, which is required for garnishes, such as, apple sauce, pear halves, or the like, or if cold items, such as dairy products, cottage cheese, and the like, are placed in the same plate as the entree.

An interior size adjustment element is illustrated in FIG. 2 and designated generally by numeral 50 and is of U-shaped configuration and includes two side members 52 and a rear or inner member 54 having parallel top and bottom edges with the bottom edges of the device having a notch 56 along the outer corner thereof, as illustrated in FIG. 2, for supporting engagement with radiation-transparent ledges or strips to be described later. The interior size adjustment element 50 enables the use of any serving plate up to the maximum inside dimension of the unit. Thus, by constructing the controller unit so that the distance between the side panels 30 and 32 is sufficient to receive a plate up to the standard 10 inch diameter, the interior size adjustment element may be inserted if smaller serving plates are to be employed such as 9 inch platters, which is another standard size, smaller saucers, dessert plates, and the like.

The adjustment element 50 assures exact placement of the dish relative to the oven interior as well as the controller apertures and increases the flexibility for proper use of the oven.

The controller 18 including the panel or plate 22 and the depending flanges 30 and 32 as well as the rear flange are constructed of radiation-opaque material such as stainless steel, equivalent metal or suitable non-metallic material. The undersurface of the plate or panel 22 is provided with a permanent shield in the form of a coating 60 of transparent plastic material or the like which prevents food from soiling the oven through the apertures and minimizes the possibility of food lodging in the door area of the oven which might permit radiation leakage. In addition, the shield 60 retains generated steam within the unit, thereby maintaining the necessary moisture content to prevent food from drying out during the heating process. Conventionally, a clear plastic material, such a "Saran", is used to cover each meal during preparation in a microwave oven and this covering is subsequently disposed of. In some instances, a heavy duty plastic dome is placed over each plate during heating and afterwards removed. Eliminating this dome or plastic covering saves considerable time, labor costs and inconvenience and also prevents a substantial loss of domes themselves which become pitted by hot fat, grease, food juices, and the like, coming into contact with them. When this occurs, the domes must be discarded because sanitation regulations prohibit the use of utensils with bacteria harboring irregular surfaces. As noted, the controller functions properly without a bottom, thus enhancing the speed and simplicity of operation, since it is much easier and faster to place serving plates in this unit as compared to heating or cooking food in special dishes or lifting plates onto a solid or perforated bottom and exactly positioning them there.

A positioning attachment generally designated by numeral 62 orients the controller properly within the oven. This is significant since each oven has its own pattern of hot and cold spots so that exact placement of the controller eliminates improper preparation of food caused by the variants of radiation energy in different areas of the same oven. The attachment is constructed so as to locate the controller unit in an off center position to allow for simultaneous heating of liquids that accompany meals, such as soups, or the like. The positioning attachment 62 is of L-shaped or angular configuration including perpendicularly arranged members 64 and 66 with member 64 extending across the rear of the controller and member 66 extending alongside of the depending flange 32, as illustrated in FIGS. 1 and 3.

An inwardly extending ledge 67 is provided along the inner bottom edge of the positioning attachment 62 to space the controller from the bottom 20 of the oven. The member 66 is provided with a laterally extending adjustment lug 68 which can be spring biased outwardly and provided with a knob or handle 70 for retraction which will assure that the unit will fit any commercial microwave oven. This attachment is constructed of radiation-transparent plastic material which insulates the controller from the oven and prevents any possible electrical arcing between them. The controller may be constructed with a radiation-transparent strip around the bottom edge thereof with this transparent plastic material along the bottom and rear of the controller enabling microwave energy to penetrate at the sides and bottom of the controller which is required for even heating of all parts of a serving in the same manner as the positioning attachment 62.

When the positioning attachment is used as in FIG. 1, the side panel 30 is provided with a radiation-transparent base strip 31 of heighth equal to the ledge 67 for proper support of the panel 30 which may have its lower edge received in a groove in strip 31. When the size adjustment element 50 is used, the notch 56 engages with the ledge 67 along the side panel 32 and across the rear of the controller and with the strip 31 along the bottom of the panel 30.

In FIG. 1, the panel 22 is provided with an L-shaped extension 72 at one side thereof which is constructed of radiation-opaque material and generally fills the space between the offset controller and the adjacent wall of the oven. The extension 72 is provided with a depending side panel 78 and a plurality of slot-like openings or smaller apertures 74 having a transparent shield 76 on the interior thereof for providing a separate area for receiving liquids, such as soup, and the like. The slots 74 or a plurality of small apertures limit the microwave energy reaching the liquid which is desirable when soups are involved because soups frequently become so hot that fat agglomerates and splatters which scores the non-disposable plastic containers used in many hospitals. When this happens, the soup bowls must be discarded as the finish is ruined and the pitted surfaces harbor bacteria. The lower edge of the side panel 78 and rear wall of extension 72 are provided with a strip 77 of radiation transparent material similar to strip 31 to insulate the extension 72 from the oven. The extension 72 will maintain the temperature of any commonly used soup between 165° and 185° F. which is sufficiently hot for consumption but not hot enough for fat agglomerization and splattering. The size, shape and location as well as the number of openings in the extension 72 can be varied to create the proper temperature range for soups used in a particular institution.

Recent developments in microwave ovens include the consideration of employing an automatic internal electrical disconnect feature that is activated in response to the presence of any metallic substance within the oven. The use of the automatic disconnect feature has resulted from frequent electrical arcing between the oven and metal foil plate wrapping or existing unsatisfactory controller units. While the positioning attachment 62 will prevent arcing, if microwave ovens are made with an automatic disconnect feature activated in response to metallic substance within the oven, the controller 18 will be constructed of radiation-opaque non-metallic materials with it being noted that the adjustable closure plates and securing means therefor all will be so constructed. Thus, it is clearly within the purview of this invention to construct the entire controller unit, size adjustment element, positioning attachment and other elements inserted into the oven of non-metallic material having the requisite opaqueness to transmission of microwave energy.

FIG. 3 illustrates an alternative construction intended for use in those ovens which do not have a large enough cavity to accommodate the extension 72 which forms the soup heating facility illustrated in FIG. 1. Thus, the bowl cannot be placed alongside the controller and, under these circumstances, the positioning attachment includes a separate side portion 79 which extends forwardly and has an elevation corresponding with the elevation of the panel 22 with the elevated portion of the positioning attachment being designated by numeral 80 to provide a relatively narrow extension of the panel or platform 22 so that a soup bowl 82 may be supported partially on the elevated portion 80 of the positioning attachment and partially on the panel 22. In this arrangement, the apertures are arranged toward the right side of the panel 22 rather than being centered as in FIG. 1. This method of heating soup is used only when the oven cavity is too narrow to allow the arrangement illustrated in FIG. 1. When heating in this fashion, the containers are not filled completely to reduce splashing, vulnerable plastic bowls are not used, high fat content soups are eliminated and only soups whose serving temperature is not critical are prepared.

While the plastic closure 60, which is in the form of a liner, or if the device is made of plastic, in the form of a radiation-transparent area and the corresponding liner 76 on the extension 72 functions to retain steam and prevents food soiling the interior of the oven, a structural innovation is provided for closing the front of the controller 18. In FIG. 1, a generally rectangular block of neoprene-type material 84 is attached to the interior of the door 14 of the microwave oven by the use of parallel adhesive strips along the inner surface of the neoprene block 84. The neoprene block 84 is dimensioned and positioned on the door in such a manner that when the door is closed, the block 84 will completely seal the front of the controller 18 through the door pressure and the soft resilience of the neoprene. Several types of adhesive and resilient, rubber-like substances are available which are not affected by microwave radiation. The sealing block 84 could also extend across the open front of the area defined by the extension 72 and serves further to insulate the controller unit and extension from the oven if the controller is constructed of metallic material. By attaching the sealing block or closure means to the door, closure of the front end of the controller will be automatically accomplished when the door is closed, thereby avoiding the necessity of the operator manipulating a closure.

Figure 6:
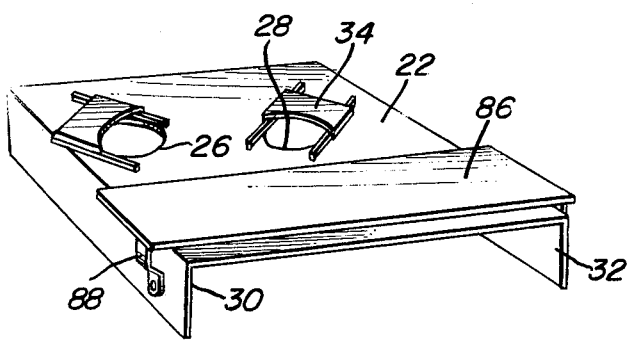
FIG. 6 is a perspective view of a controller having a pivotal closure door for the forward end thereof.

FIG. 6 illustrates an alternative structure for closing the front of the controller which includes a simple pivoted door 86 attached to the side panels 30 and 32 so that it can be manually swung downwardly into a position overlying and closing the front end of the controller or positioned in overlying relation to the panel 22. The particular manner of mounting the closure 18 may be varied depending upon installation requirements. For example, the closure door 86 may be supported by pivot pins or pivot structures in the form of straps or brackets 88, as illustrated, attached to the side panels or by suitable pivotal support structures attached to the upper panel 22 so that operation of the door 18 will not affect the installation of the extension 72 or the elevated portion 80, as illustrated in FIG. 3. The door 86 would be simply lowered before closing the oven door and after use, it would be raised into overlying relation to the panel 22. While this structure requires manual manipulation, it eliminates attachment of structure to the existing microwave oven.

While only a single controller has been illustrated in association with a conventional microwave oven, the present invention also contemplates the use of two or more controllers in a side-by-side arrangement in a large microwave oven which would allow preparation of multiple plates or dishes in a large oven. Any suitable type of connection may be provided between the side-by-side controllers with, of course, the controllers being insulated from the oven, if constructed of electrically conductive material which can be accomplished by using the positioning attachment or equivalent spacers having ledges which support the bottom edges of the side panels from the bottom of the oven.

With the controller, meals may be prepared on standard size serving plates or dishes with the food remaining on those dishes from the time the meal is prepared until it is consumed without a clear plastic sheet overlay or a plastic dome being used. The adjustable opening feature enable the microwave energy engaging different foods on a single plate or different foods on different smaller dishes to be adjusted in order to heat or cook such foods to a desired temperature level. The plastic shield prevents food from passing upwardly through the openings into engagement with the oven and retains moisture conditions in adjacency to the food on the plates or dishes thereby eliminating the necessity of separate plastic domes or coverings for the dishes. The interior size adjustment element adapts the controller for use with various standard size plates, platters, saucers, and the like and the positioning attachment enables the controller to be used with various types of ovens and orients the controller in offset relation to enable controlled heating of soup or other liquids with two embodiments of the positioning attachment being illustrated for use depending upon the dimensional characteristics of the microwave oven involved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a microwave oven, having a bottom surface, rear wall, side walls and a door, a controller comprising a generally horizontally disposed panel supported in the oven in spaced relation to the bottom surface thereof for receiving standard sized serving dishes thereunder, said panel being constructed of material to occlude passage of microwave energy, and adjustable aperture defining means in said panel for controlling passage of microwave energy therethrough for controlling the temperature to which the food on the dish is heated.

2. The structure as defined in claim 1, wherein said aperture defining means includes three openings oriented in a pattern so that the intersecting point of the radii of the openings will overlie the center of a serving dish to control microwave energy engaging food on different portions of the serving dish, and an adjustable closure member for each of the openings to enable different foods on the dish to be heated to different temperature levels.

3. The structure as defined in claim 2, wherein one of said openings is larger than the other openings for alignment with the entree on the serving dish.

4. The structure as defined in claim 3, wherein each aperture includes a closure member, each closure member being in the form of a sliding plate, indicia associated with said sliding plates to indicate the position of the plates to enable the desired position of the plates to be preset thereby enabling operators to be instructed in adjustment of the closure members and to enable predetermined heat conditions to be obtained for the diverse foods on the serving dish.

5. The structure as defined in claim 1, wherein said panel is provided with depending side flanges supporting said panel in predetermined elevated relation to the microwave oven bottom surface, and a microwave energy transparent closure for the aperture defining means in the panel enabling transmission of microwave energy therethrough but preventing passage of food particles and moisture vapor upwardly through aperture defining means in the panel for controlling moisture conditions around the food and preventing soiling of the interior of the oven.

6. The structure as defined in claim 1, together with a positioning attachment for the controller, said positioning attachment including spacer members interposed between the controller and the side and rear walls of the oven for accurately positioning the controller in relation to the oven in order that the controller will be disposed in a predetermined relation to the pattern of hot and cold spots in each respective oven.

7. The structure as defined in claim 6, together with an interior size adjustment element insertable below the panel and including a rear member and two side members to decrease the interior perimeter of the controller to enable smaller sized standard serving dishes to be positioned under the panel in predetermined relation to the aperture defining means.

8. The structure as defined in claim 6, wherein said positioning attachment includes a laterally adjustable lug projecting toward the oven to enable the controller to fit within microwave ovens having different interior dimensions.

9. The structure as defined in claim 1, wherein said panel and aperture defining means are constructed solely of non-metallic, radiation-opaque, electrically non-conductive material to eliminate hazards and equipment destruction associated with and resulting from electrical arcing between the microwave oven interior and the controller.

10. The structure as defined in claim 1, wherein the periphery of the area below the panel is enclosed in order to maintain complete retention of generated steam thereby insuring proper moisture conditions in finished servings, elimination of interior oven soiling due to activity of food during preparation and prevention of door closing problems and subsequent radiation leakage caused by escaped food lodging between the oven door and the oven.

11. The structure as defined in claim 1, wherein said panel is supported from the oven by depending side flanges, and extension means along one side of the controller to provide a separate compartment for simultaneous preparation of hot beverages, soups, and the like.

12. The structure as defined in claim 11, wherein said extension is of radiation-opaque material and provided with aperture defining means therein for controlling the temperature of hot beverages, soups, and the like.

13. The structure as defined in claim 1 wherein said adjustable aperture defining means includes adjustment means allowing flexibility of adjustment settings without removal of the controller from the oven.

14. The structure as defined in claim 1, together with means supporting said panel in elevated relation to the bottom surface of the microwave oven with the supporting means including radiation-transparent material forming a supporting base with the supporting means including an open bottom thereby eliminating the use of a solid or perforated bottom in the controller.

15. The structure as defined in claim 1, wherein said aperture defining means are oriented in constant, predetermined relationship to the panel thereby assuring a predetermined centering relationship of the aperture defining means on any size food service placed under the panel.

16. The structure as defined in claim 1, wherein said panel includes depending side flanges insulated from the bottom of the microwave oven, and at least one additional controller of identical construction for use in a large microwave oven thereby enabling maximum production of finished meals commensurate with the size of the microwave oven by simultaneous multiple meal preparation.

17. The method of handling an entire meal for institutional serving and consumption comprising the steps of pre-plating the entire meal, freezing the assembled meal and plate, cooking or reconstituting the entire meal while on the plate and serving and consuming the meal while on the plate, said step of cooking or reconstituting the meal including the step of inserting the plate into a controller unit inserted into a microwave oven, and adjusting the controller unit for controlling the degree of cooking or reconstituting of each component of the meal to a desired finished condition.

18. A controller for use in heating a product by microwave energy comprising a panel opaque to microwave energy positioned to occlude passage of microwave energy to the product, said panel including a portion thereof transparent to microwave energy and means opaque to microwave energy adjustably associated with said portion of the panel transparent to microwave energy thereby controlling the quantity of microwave energy passing through said portion of the panel for heating the product to a desired temperature.

19. The structure as defined in claim 18 wherein said portion of the panel transparent to microwave energy includes at least one opening through the panel, said means adjustably associated with said portion including a closure member, and means adjustably mounting said closure member from said panel for movement to selectively close said opening to vary the transmissivity of microwave energy through the opening.

20. The structure as defined in claim 19 wherein said closure member is in the form of a plate disposed substantially parallel to the panel and adjacent thereto, and a closure panel in said opening to isolate the product from the closure member, said closure panel being transparent to microwave energy.

* * * * *